E. F. WATERBOR AND T. H. SIMPSON.
VEHICLE WHEEL.
APPLICATION FILED JUNE 3, 1918.
1,433,764.   Patented Oct. 31, 1922.
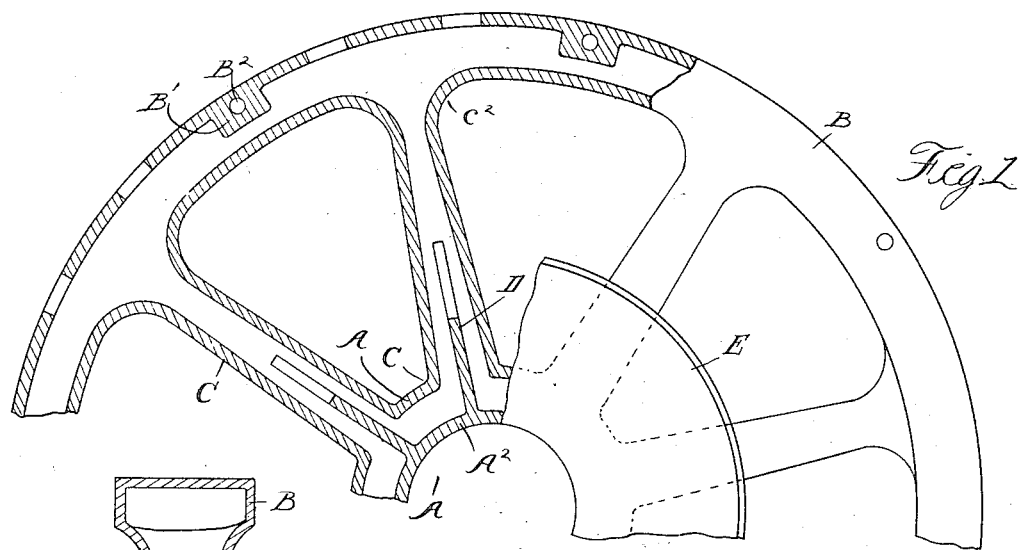
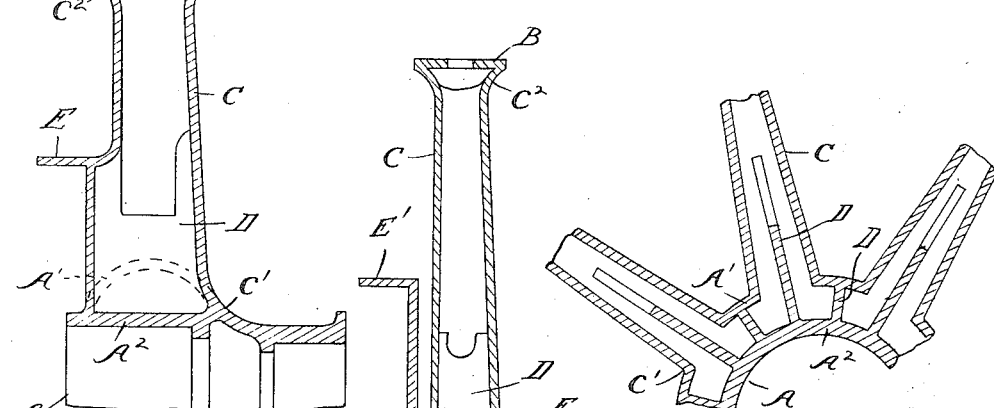
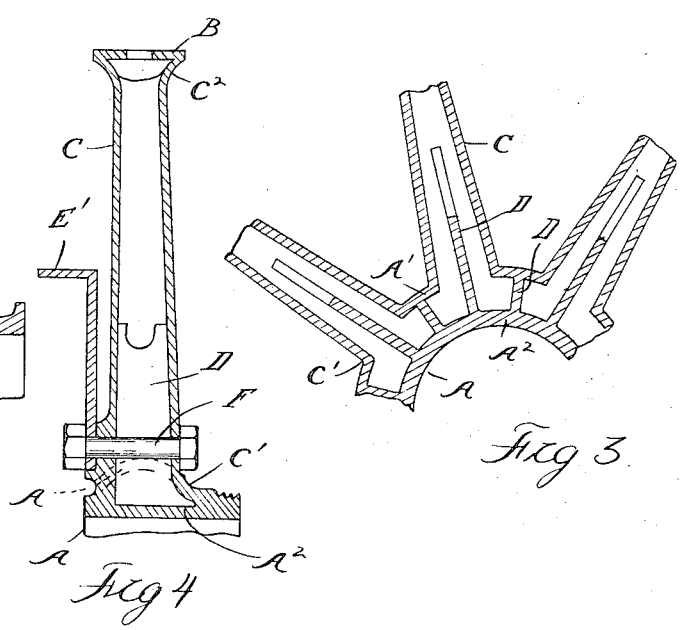
Inventors
Elmer F. Waterbor
Thomas H. Simpson
By Whittemore Hulbert Whittemore
Attorneys Patented Oct. 31, 1922.

1,433,764

UNITED STATES PATENT OFFICE.

ELMER F. WATERBOR AND THOMAS H. SIMPSON, OF DETROIT, MICHIGAN, ASSIGNORS TO MICHIGAN MALLEABLE IRON COMPANY, OF DETROIT, MICHIGAN, A CORPORATION OF MICHIGAN.

VEHICLE WHEEL.

Application filed June 3, 1918. Serial No. 237,881.

*To all whom it may concern:*

Be it known that we, ELMER F. WATERBOR and THOMAS H. SIMPSON, citizens of the United States of America, residing at Detroit, in the county of Wayne and State of Michigan, have invented certain new and useful Improvements in Vehicle Wheels, of which the following is a specification, reference being had therein to the accompanying drawings.

The invention relates to vehicle wheels of the cast metal type and one of the objects of the invention is to obtain a construction having hollow spokes which are reinforced by integral webs. Another object is to obtain a construction having a hollow hub which is also reinforced by integral webs. A further object is to obtain a construction in which the hub has an imperforate wall for forming the bearing for the axle and also has an arched wall connecting into the spokes so that the stress transmitted by the spokes is carried thereby. Still another object is to obtain a construction having an integral hollow felly which has transversely-extending reinforcing portions with apertures therethrough for engagement with the rim securing means. Other objects of the invention reside in the novel arrangements and combinations of parts as more fully hereinafter set forth.

In the drawings:

Figure 1 is a sectional elevation of a portion of the vehicle wheel embodying my invention;

Figure 2 is a cross-section on the line 2—2 of Figure 1;

Figure 3 is a cross-section in the plane of the wheel through a portion of a modified construction;

Figure 4 is a view similar to Figure 2 of a modified construction.

A is the hub, B the felly, and C are the hollow radially-extending spokes integrally connected with the hub and felly. The spokes C preferably taper outwardly and have their inner ends $C'$ merging into the hub and their outer ends $C^2$ merging into the felly, these outer ends being flared and hollow. The felly B is hollow throughout its whole extent and has the integral transversely-extending reinforcing portions $B'$ at suitable intervals, which are provided with the apertures $B^2$ extending therethrough for engagement with suitable rim securing means (not shown). The hub A is hollow and has the outer wall $A'$, which connects into the inner ends $C'$ of the hollow spokes, and also the inner wall $A^2$, which forms the bearing for the axle (not shown) passing through the wheel. The outer wall $A'$ is arched transversely of the wheel so that the stresses transmitted from the spokes to the hub are more easily carried thereby. The inner wall $A^2$ is imperforate so that a more extended and stronger bearing is provided in the hub.

For reinforcing the spokes C integral webs D are provided, which preferably extend longitudinally within the spokes and connect into their opposite side walls. The webs also extend to the inner wall $A^2$ of the hub and thus reinforce the hub also.

With the construction as described it is readily seen that the wheel has the maximum of strength with the minimum of weight, since the hub, spokes and felly are each hollow and have reinforcing means. Furthermore, the hub itself has great strength with the minimum amount of metal due to the fact that the outer wall of the hub is arched and is subjected to the stresses transmitted through the spokes and also due to the fact that the inner wall of the hub is imperforate and forms an extended bearing which is not weakened, as by holes therethrough.

As shown in Figures 1 and 2, the wheel is provided with the brake-drum E, which is integral with the hollow spokes and extends inwardly therefrom, the spokes being slightly enlarged between the drum and the hub and the reinforcing web D extending within the enlarged portion of the spoke for reinforcing the same.

As shown in the modified construction in Figure 3, additional reinforcing webs $D'$ are provided extending radially between the inner and outer walls $A'$ and $A^2$ respectively of the hub A intermediate the points of connection of the spokes C with the outer wall.

In the modified construction shown in Figure 4, the arrangement of parts is very similar to that shown in Figures 1 and 2 with the exception that the brake-drum $E'$ is not cast integral with the wheel but is secured thereto by suitable securing means, such as the bolts F extending transversely through the spokes.

What we claim as our invention is:

1. In a vehicle wheel, the combination with a series of hollow spokes, of an integral hollow hub provided with an outer arched wall connecting into said spokes and an inner imperforate wall for forming the bearing for the axle, and relatively long webs within said spokes and hub for reinforcing the same.

2. In a vehicle wheel, the combination with a series of spokes, of an integral hollow hub having an imperforate wall for forming the bearing for the axle, and integral webs within said hub connecting said imperforate wall to said spokes.

3. In a vehicle wheel, the combination with a series of hollow spokes, of an integral hollow felly having parallel side walls, and transversely-extending reinforcing portions in said felly connecting said parallel side walls and having apertures therethrough for engagement with rim securing means.

4. In a vehicle wheel, the combination with integral hollow spokes and hub, of a reinforcing web extending longitudinally of one of said spokes and transversely of the plane of rotation thereof, said web being at the inner end of said spoke and connecting into the inner wall of said hub.

5. In a vehicle wheel, the combination with a series of hollow spokes having enlarged inner ends with lateral shoulders at one side of the wheel of integral webs extending transversely of the plane of rotation of the wheel across the enlarged ends and connecting into the lateral shoulders.

6. In a vehicle wheel, the combination with integral hollow spokes and hub, of reinforcing webs extending longitudinally of said spokes and connecting into their opposite side walls, said webs also connected into the inner wall of said hub.

7. In a vehicle wheel, the combination with a series of hollow spokes, of an integral hub having spaced walls, one of said walls being connected to the inner ends of said spokes, and webs extending longitudinally of said spokes and connected to the opposite side walls thereof, said webs also extending to the other wall of said hub, and additional reinforcing webs connecting the spaced walls of said hub.

8. In a vehicle wheel, the combination with a series of hollow spokes, of an integral hub having spaced walls, one of said walls being connected to the inner ends of said spokes, webs extending longitudinally of said spokes and connected to the opposite walls thereof, said webs also extending to the other wall of said hub, and additional reinforcing webs extending radially between the spaced walls of said hub intermediate the points of connection of said spokes.

In testimony whereof we affix our signatures.

ELMER F. WATERBOR.
THOMAS H. SIMPSON.